Feb. 9, 1960        J. M. EASTMAN        2,924,070
FUEL FEED AND POWER CONTROL SYSTEM FOR GAS TURBINE ENGINES
Filed July 16, 1956
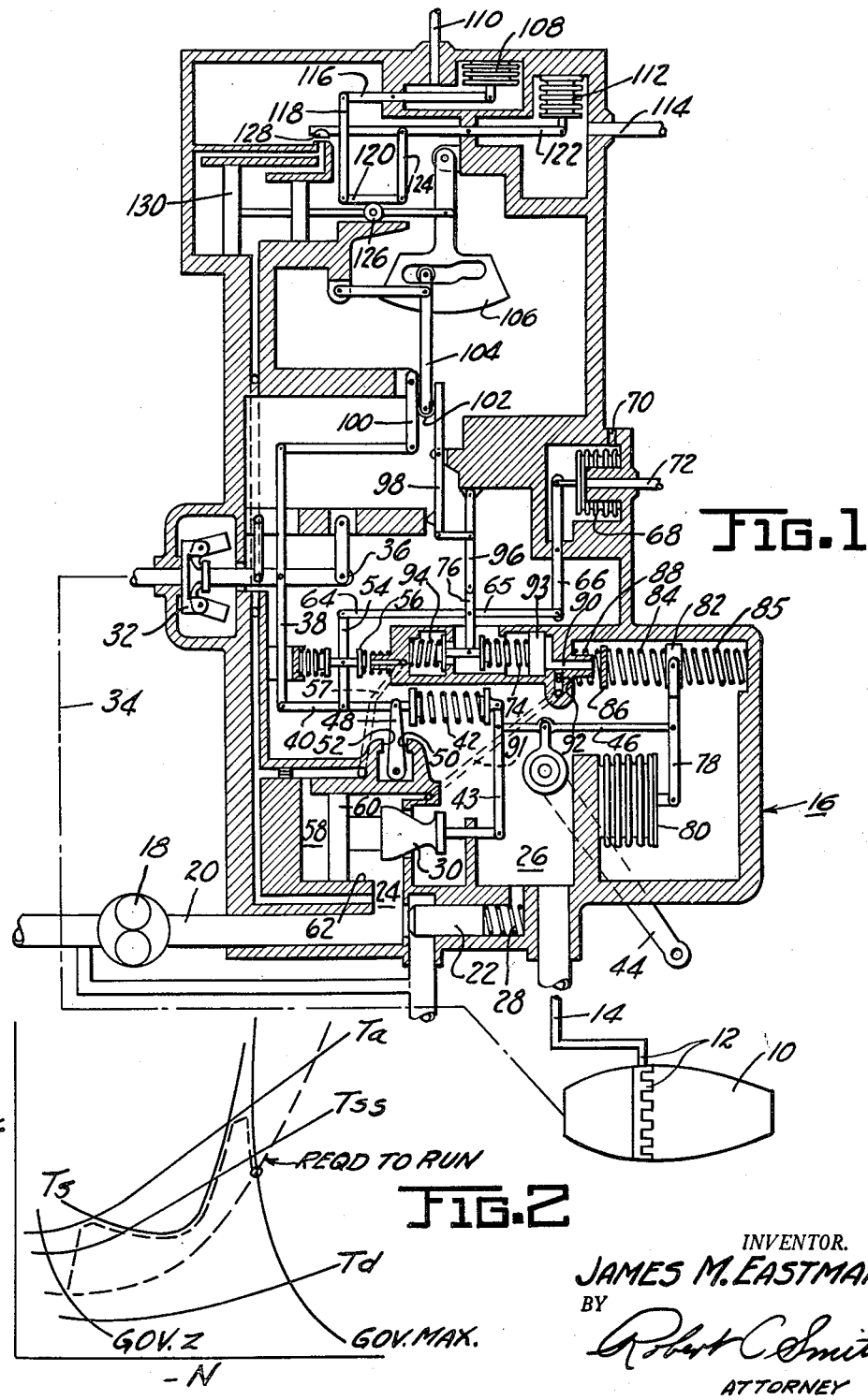
INVENTOR.
JAMES M. EASTMAN
BY
Robert C. Smith
ATTORNEY

United States Patent Office 2,924,070
Patented Feb. 9, 1960

2,924,070

FUEL FEED AND POWER CONTROL SYSTEM FOR GAS TURBINE ENGINES

James M. Eastman, South Bend, Ind., assignor to Bendix Aviation Corporation, South Bend, Ind., a corporation of Delaware Application July 16, 1956, Serial No. 598,058

8 Claims. (Cl. 60—39.28)

The present invention pertains to fuel systems for gas turbine engines and more particularly to a hydro-mechanical control system in which a number of temperature limits are established for different operating conditions.

In fuel systems for gas turbine engines the accelerating fuel flow is customarily scheduled to avoid such limits as maximum turbine or tailpipe temperature, and a somewhat lower limit imposed by compressor stall. Most of the existing hydro-mechanical fuel systems rely upon fuel scheduling to synthesize the various temperature limits. Fuel scheduling, however, suffers from inaccuracy due to variations in fuel density, fuel heating value, and burner efficiency. It is, therefore, an object of the present invention to provide a hydro-mechanical fuel control which does not schedule fuel but which relies on direct temperature sensing to establish fuel flow limits for varying conditions.

It is another object to provide a hydro-mechanical fuel system having direct temperature sensing in which the permissible temperature limit is reduced for acceleration over the compressor stall region of the engine.

It is another object to provide a hydro-mechanical fuel system in which a minimum temperature limit is provided to avoid loss of combustion due to excessively lean fuel/air mixtures during deceleration.

It is a further object to provide a control in which the various operating parameters used to meter fuel are largely brought into operation through the controlling of forces responsive to said operating parameters.

Other objects and advantages will become apparent from the following specification considered in connection with the accompanying drawings, in which:

Figure 1 is a schematic drawing of an embodiment of my invention; and

Figure 2 is a graph in which weight of fuel flow $W_f$ is plotted against engine speed N to show the various temperature limits supplied by the device of Figure 1.

In the device shown in Figure 1, the parts are shown in the governing stage of operation. The engine 10 is supplied with fuel by means of a fuel manifold 12 connected to a fuel conduit 14 on the discharge side of the fuel control, shown generally at numeral 16. Fuel is supplied to the control 16 from a source, not shown, by means of a pump 18 and an inlet conduit 20. A conventional by-pass valve structure 22 senses the fuel control inlet pressure in chamber 24 and the control outlet pressure in chamber 26 and by means of a calibrated spring 28 serves to maintain a constant pressure drop across the main metering valve 30. A conventional flyweight governor structure 32 is driven by the engine 10 through a linkage 34. The shoes of governor 32 act to move a follower member 36 axially in response to changes in the speed of engine 10. A lever 38 is pinned to follower member 36 and a shaft 40 is pinned to one end of member 38. A spring 42 is positioned between a spring retainer member attached to one end of shaft 40 and a retainer member attached to one end of a lever 43 drivably attached to fuel metering valve 30. A throttle lever 44 acts through a link 46 and lever 43 to vary the compression on spring 42. It will thus be seen that the flyweights 32 acting through follower member 36, lever 38 and shaft 40 act to oppose the setting of throttle lever member 44 acting through members 46 and 43. Movement of shaft 40 is limited by a member 48 which is pinned to said shaft on one end and is attached at its other end to a fixed point on the housing of control 16. Member 48 is free to move only in an arc limited by a pair of stops 50 and 52. As shaft 40 is moved in an axial direction, it carries with it a lever 54 to which is connected a servo valve member 56. Valve member 56 controls the release of fluid (in this case fuel) via passage 57 from a chamber 58 where this fluid pressure acts against a piston 60 slidable in a cylinder 62 formed in the housing of control 16. When valve 56 is closed, full supply fuel pressure is developed in chamber 58 so that the area unbalance of valve 30 drives the valve closed. When valve 56 is open, the pressure in chamber 58 falls to that in chamber 26, so the valve 30 is driven open. An intermediate "null" position of valve 56 is required to hold the intermediate pressure needed in chamber 58 to hold valve 30 stationary. As such, it will be seen that the main metering valve 30 is hydraulically driven at a speed and in a direction determined by the departure of valve 56 from its null position. With the structure as shown, movement of the follower member 36 in response to changes in position of flyweights 32 causes a force acting through shaft 40 to exceed the load on spring 42 established by throttle member 44, causing valve 56 to move in the closing direction. This causes valve 30 to also move in the closing direction, thus reducing fuel flow and engine r.p.m. so that regulation is established. As the valve 30 moves closed, the load on spring 42 is increased through the action of lever 43. This causes an increase in r.p.m. setting as valve 30 closes and the fuel flow decreases. Thereby a proportional governor is established. As long as the fuel flow is not bounded by other limits and the governor is controlling flow, the action is essentially as described and the parts are in the positions shown.

Also effective to control the action of servo valve 56 are a number of forces acting through a link 64. Attached to one end of link 64 is a link 65 which is, in turn, pinned to a lever 66 attached to a temperature responsive bellows 68. The outside of bellows 68 is in communication with ambient pressure through a passage 70 and the inside of said bellows is in communication with a pressure proportional to engine operating or tailpipe temperature. This temperature responsive pressure which is supplied through a conduit 72 may be created through the action of a temperature indicating device such as that shown in copending application Serial No. 605,106, filed in the name of James M. Eastman (common assignee). If in the course of governing, fuel valve 30 should pass enough fuel to exceed the steady-state temperature limit, the link 64, acting in response to movement of link 65, lever 66 and bellows 68, pulls servo valve 56 closed as necessary to limit fuel flow and hold the temperature at the set limit. Since the governor is still trying to control, any resulting decrease in r.p.m. will cause the shaft 40 to move to the left until its motion is stopped by stop member 52. The governor is then said to be saturated. Since link 64 can still pull the servo valve 56 closed, the steady-state temperature continues to be regulated and temperature control overrides speed control. Any time the temperature exceeds the steady-state limit, the tensile force in link 65 resulting from the increased pressure in bellows 68 overpowers the preload of spring 74 and lever 76 pivots counterclockwise about its upper end thereby actuating link 64 and permitting steady-state temperature control as described. The preload in spring 74 determines the steady-state temperature limit setting.

The present control also includes a temperature limiter for acceleration. Link 46 which is driven by throttle lever 44 is attached to a lever 78 connected on one end to a dashpot 80 and on the other end to a spring retainer member 82 in such manner that the top end of lever 78 effectively floats between a pair of springs 84 and 85. Movement of throttle lever 44 in a counterclockwise direction to provide an increased engine r.p.m. setting causes a translation of link 46 to the left and, because of the tendency of dashpot 80 to remain essentially stationary, lever 78 is rotated about its lower end increasing the compression on spring 84. As the compression on spring 84 is increased, it causes a control valve member 86 to be moved to the left against the action of a spring 88 thus closing off a control passage 90. Inasmuch as this passage is in communication with pump discharge pressure through a passage 91 and a bleed 92, the fluid pressure in passage 90 increases. This pressure in passage 90 acts on piston 93 urging it to the left thus increasing the preload on spring 74. In this manner the setting on the temperature control is increased for accelerating the engine. The movement of the top of lever 78 which caused the valve 86 to close produced an unbalanced spring load on the top of the lever 78. This load acts through the lever to cause the dashpot bellows 80 to compress. The dashpot accordingly moves slowly until the top of lever 78 is restored to its balanced position and the initial movement of lever 46 is fully absorbed by repositioning of the dashpot. When the top of lever 78 nears its balanced position the reduced spring load on the back of valve 86 permits it to open again. Piston 93 then returns to the position shown and the increased load on spring 74 is again relaxed so that steady-state temperature control is established. Thus the increased temperature limit for acceleration is effective only for a limited time—which varies with the amount of increase in r.p.m. requested by the lever 44. The duration of the increased temperature limit is controlled by the design of the dashpot and springs to be adequate to permit reaching the new speed setting without being long enough to permit significant reduction in engine life by the temporary relaxing of the steady-state temperature limit.

Deceleration is accomplished by controlling temperature to a minimum limit. As for the upper limit, control is through servo valve 56 via links 64 and 65. In this case, under-temperature is prevented by opening the servo valve to increase fuel flow. As before, the temperature limit overrides the governor which is now saturated in the decrease direction against the stop 50 which limits rightward movement of shaft 40. When the minimum temperature limit is reached, the tension in lever 65 is reduced so much that the preload of spring 74 overcomes both this tension load and the preload of a spring 94. This results in clockwise movement of lever 76 about its upper end and opening of the servo valve 56, thereby increasing flow as needed to hold temperature at the minimum limit.

It has been determined that turbine inlet temperature, corrected for varying values of compressor inlet temperature, is a function of compressor pressure ratio and also that corrected speed is a function of compressor pressure ratio. From these relations it has been determined that if, during acceleration of the engine, turbine inlet temperature is regulated to a setting held proportional to the product of the square of engine r.p.m. and some function of compressor pressure ratio, the compressor stall region of the engine can be skirted so as to provide maximum engine acceleration without developing compressor stall. If the temperature regulated by the control is tailpipe temperature rather than turbine inlet temperature, the control parameters will be the same because the ratio of tailpipe temperature to turbine inlet temperature is also essentially a function of compressor ratio. Since the compressor stall limit will only be reached during acceleration, the governor will be saturated in the increase direction, i.e., shaft 40 will be in its most leftward position as determined by the stop 52. Control of accelerating flow could be assumed to be on the accelerating limit normally, with bellows 68 interacting with spring 74 to control temperature. When the stall temperature limit comes into action, that portion of the tensile load of link 65 which is applied to the bottom of lever 96 causes it to pivot counterclockwise about its upper end, tending to close the servo valve 56 via lever 76 and links 64 and 65. This reduces fuel flow until the resulting temperature reduction reduces the tension of link 65 so that it balances the force trying to hold lever 96 in the position shown. A new temperature equilibrium is thus established. If the load in link 65 which produces movement of lever 96 is less than that needed to overcome spring 74, the bottom of lever 96 returns to the position shown, and the new lower temperature is established by the loading of the lower end of lever 76. For the stall limit, the load for which the bottom of lever 96 is pulled to the right of the position shown, is established by the clockwise torque on a lever 98. The governor flyweight structure 32 acts through follower member 36 and lever 38 to apply a counterclockwise torque to a lever 100 proportional to the square of engine r.p.m. This torque is transferred to lever 98 by a roller 102 at the bottom end of a shaft 104 which is vertically positioned as a function of the compressor pressure ratio through the action of a cam 106. By appropriately contouring the cam 106, the clockwise torque acting on lever 98 is made proportional to engine speed squared times the desired function of compressor pressure ratio.

The cam 106 is movable with compressor pressure ratio through the action of a mechanism shown in copending application Serial No. 276,791 filed in the name of Frank C. Mock (common assignee). In this pressure ratio computer the exterior of an evacuated bellows 108 is placed in communication with ram pressure through a conduit 110 and the exterior of a second evacuated bellows 112 is placed in communication with compressor discharge pressure by means of a conduit 114. Bellows 108 is attached to lever 116 and a link 118 in such manner as to exert a force on one end of a beam 120. In similar fashion bellows 112 is connected through a lever 122 and a link 124 to the opposite end of beam 120 to exert a force proportional to compressor discharge pressure on the right end of said beam. When these forces balance, the location of a movable fulcrum roller 126 is an indication of pressure ratio. When they are unbalanced, a half-ball valve 128 is opened or closed to actuate the piston 130 connected to the fulcrum roller to restore it to the balanced position. Cam 106 is linked to the roller and is thereby positioned as a function of compressor pressure ratio. The cam contour provides the specific pressure ratio function used in obtaining the compressor stall limiting schedule.

From the above it can be seen that for all operation for which the temperature is less than the square of the speed times the desired function of the compressor pressure ratio, the link 65 will not have enough tensile load to act through levers 76 and 96 to pull lever 98 counterclockwise away from its stop. When the temperature tends to be greater than this value, servo valve 56 is actuated to limit the temperature to this maximum value. Thereby the desired temperature setting is scheduled to skirt the compressor stall region of engine operation.

In the preceding, the several regulating modes of the fuel control have been described. Curves on the graph (see Figure 2) picture how they would each regulate fuel with respect to engine r.p.m. A typical acceleration excursion is illustrated by the dotted line. Starting from the idle-governor curve at the required-to-run line the throttle is increased to the maximum setting. The shaft 40 immediately moves to the left and becomes saturated against stop 52 with the servo valve 56 full open. The fuel valve 30 immediately starts opening and increasing fuel flow at its maximum rate. Movement of the throttle lever has raised the load on spring 74 so that the acceleration temperature limit $T_a$ replaces the steady-state limit $T_{ss}$. When the fuel flow increases along the dotted line to the $T_a$ line, the increased temperature causes bellows 68 to overpower spring 74 such that the servo valve 56 is closed sufficiently to regulate fuel flow as needed to maintain operation on the line $T_a$. After a short period of acceleration at the $T_a$ limit, the fuel flow approaches the stall limit $T_s$. When this limit is reached, the force holding lever 98 against its stop has reduced to the extent that it is balanced by the force of bellows 68 at the acceleration temperature $T_a$.

Further increase in r.p.m. reduces the holding force of lever 98 and bellows 68 operates the servo valve 56 to control the lower temperature now needed to balance the holding force. Spring 74 pushes the bottom of lever 76 back to the position shown (saturated, increase) and further acceleration then proceeds with the temperature regulated to $T_s$ to avoid stall. When the $T_s$ curve again intersects $T_a$, the reverse procedure occurs. Lever 98 returns to its stop and spring 74 is compressed to regulate the temperature to $T_a$ again. When, after further acceleration, the $T_a$ curve intersects the governor maximum speed curve, lever 40 moves to the right as needed to bring the fuel flow down to the "required-to-run" curve and the bottom of lever 76 returns to the position shown.

On deceleration, the operation is similar to acceleration except that only one minimum temperature limit applies. When the governor setting is moved from the maximum to the idle position the shaft 40 immediately moves to its rightward saturation stop 50 and the fuel valve 30 starts closing rapidly. When the deceleration temperature limit is reached, spring 94 is compressed and the servo valve 56 is opened as needed to hold the minimum deceleration temperature. When the engine decelerates to the point where $T_d$ curve intersects the governor idle curve, further deceleration causes shaft 40 to move to the left as needed to cause the fuel flow to be maintained along the governor idle curve until the steady-state idle speed is reached. As soon as the fuel flow appreciably exceeds the $T_d$ curve, spring 94 returns to the position shown and normal governing occurs.

Although only one embodiment is shown and described herein, modifications may be made to suit the requirements of individual applications.

I claim:

1. A fuel control system for a gas turbine engine comprising a conduit, a valve in said conduit, fluid pressure responsive means for controlling the position of said valve, a servo valve for controlling said fluid pressure responsive means, a throttle linkage, a linkage system interconnecting said throttle linkage and said fuel valve, a governor, a linkage system interconnecting said governor and said servo valve, a spring interconnecting said throttle linkage system and said governor linkage system, a temperature responsive device, a linkage connected to said temperature responsive device for transmitting a force varying with engine operating temperature to said servo valve, resilient means for providing a reference force for said temperature responsive force, a dashpot interconnected with said throttle for varying the effective calibration of said resilient means during acceleration of the engine, means producing a movement varying with compressor pressure ratio, means interconnected with said governor to produce a force varying with engine speed, and a linkage system responsive to said two last named means and interconnected with said temperature responsive linkage for overriding the effect of said resilient means over part of the acceleration schedule of the engine.

2. A fuel control system for a gas turbine engine comprising a conduit, a fuel valve, fluid pressure responsive means for controlling the position of said valve, a servo valve for controlling said fluid pressure responsive means, a throttle, a linkage system connecting said throttle with said fuel valve, a governor, a linkage system interconnecting said governor and said servo valve, a spring interconnecting said throttle linkage system and said governor linkage interconnecting said governor and said servo valve, a spring interconnecting said throttle linkage system and said governor linkage system, a temperature responsive device, a linkage responsive to said temperature responsive device for also controlling said servo valve, calibrated resilient means for providing a reference force for said temperature responsive linkage, dashpot means interconnected with said throttle for varying the effective calibration of said resilient means during acceleration of the engine, a linkage system responsive to engine speed and compressor pressure ratio interconnected with said temperature responsive linkage for overriding said resilient means over part of the acceleration schedule of the engine.

3. A fuel control system for a gas turbine engine comprising a conduit, a fuel valve, fluid pressure responsive means for controlling the position of said valve, a servo valve for controlling said fluid pressure responsive means, a throttle, an all-speed governor connected to said throttle, said fuel valve and to said servo valve through a first linkage, a temperature responsive device, a second linkage connecting said temperature responsive device to said servo valve, resilient means providing a reference force opposing the force of said second linkage, dashpot means interconnected with said throttle for varying the effective force of said resilient means during acceleration of the engine, and means responsive to engine speed and compressor pressure ratio for providing a force overriding the effect of said resilient means over a portion of the acceleration schedule of the engine.

4. A fuel control system for a gas turbine engine comprising a conduit, a fuel valve, fluid pressure responsive means for controlling the position of said valve, a servo valve for controlling said fluid pressure responsive means, a throttle, a governor connected to said throttle, said fuel valve and to said servo valve, a temperature responsive device, means connecting said temperature responsive device to said servo valve, resilient means providing a reference force opposing the force of said connecting means, dashpot means interconnected with said throttle for varying the effective force of said resilient means, and means responsive to engine speed and compressor pressure ratio for overriding the effect of said resilient means over a portion of the acceleration schedule of the engine.

5. A fuel control system for a gas turbine engine comprising a conduit, a fuel valve in said conduit, fluid pressure responsive means for controlling the position of said fuel valve, a servo valve for controlling said fluid pressure responsive means, a throttle, a governor operably connected to said throttle and to said servo valve, engine operating temperature responsive means operatively connected to said servo valve, resilient means providing a reference temperature operable with said engine operating temperature responsive means, time delay means connected to said throttle operable to vary the reference temperature value of said resilient means and means responsive to engine operating conditions related to compressor stall for controlling said servo valve and acting as a limit on said resilient means.

6. A fuel control system for a gas turbine engine, comprising a conduit, a fuel valve in said conduit, a fuel valve positioning means for controlling the position of said fuel valve, a throttle, a governor operably connected to said throttle and to said fuel valve positioning means, engine operating temperature responsive means operatively connected to said fuel valve positioning means, resilient means providing a reference temperature operable with said engine operating temperature responsive means, time delay means connected to said throttle operable to vary the reference temperature value of said resilient means and means responsive to engine operating conditions related to power output for controlling said fuel valve positioning means and acting as a limit on said resilient means.

7. A fuel control system for a gas turbine engine, comprising a conduit, a fuel valve in said conduit, a fuel valve positioning means for controlling the position of said fuel valve, a throttle operably connected to said fuel valve positioning means, engine operating temperature responsive means operatively connected to said fuel valve positioning means, reference temperature means providing a reference temperature operable with said engine operating temperature responsive means, time delay means connected to said throttle operable to vary the reference temperature value of said reference temperature means and means responsive to engine speed and compressor pressure ratio for overriding the effect of said reference temperature means over a portion of the acceleration schedule of the engine.

8. A fuel control system for a gas turbine engine, comprising a conduit, a fuel valve in said conduit, a fuel valve positioning means for controlling the position of said fuel valve, a throttle operably connected to said fuel valve and to said fuel valve positioning means, engine operating temperature responsive means operatively connected to said fuel valve positioning means, reference temperature means providing a reference temperature operable with said engine operating temperature responsive means, means connected to said throttle operable to vary the reference temperature value of said reference temperature means and means responsive to engine speed and compressor pressure ratio for overriding the effect of said reference temperature means over a portion of the acceleration schedule of the engine.

References Cited in the file of this patent

UNITED STATES PATENTS

| | | |
|---|---|---|
| 2,691,268 | Prentiss | Oct. 12, 1954 |
| 2,708,826 | Torell | May 24, 1955 |

UNITED STATES PATENT OFFICE
CERTIFICATE OF CORRECTION

Patent No. 2,924,070                              February 9, 1960

James M. Eastman

It is hereby certified that error appears in the printed specification of the above numbered patent requiring correction and that the said Letters Patent should read as corrected below.

Column 8, line 4, for "value" read -- valve --.

Signed and sealed this 4th day of October 1960.

(SEAL)
Attest:
KARL H. AXLINE                                 ROBERT C. WATSON
Attesting Officer                              Commissioner of Patents